Jan. 21, 1964    R. N. WALLACE    3,118,693
PIPE CONNECTION
Filed Oct. 28, 1960
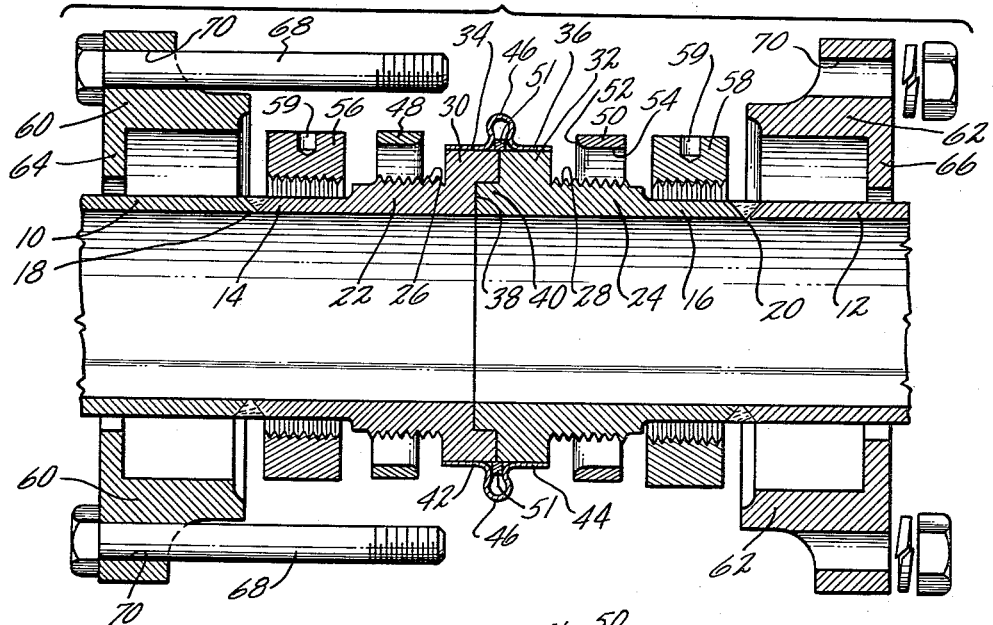
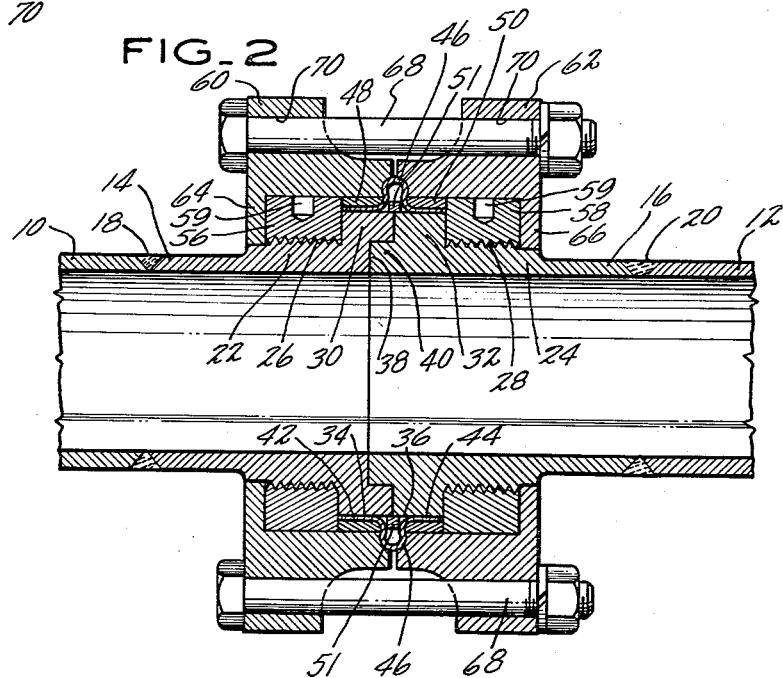
INVENTOR
RUDOLF N. WALLACE
BY M. B. Tasker
ATTORNEY

United States Patent Office 3,118,693
Patented Jan. 21, 1964

3,118,693
PIPE CONNECTION
Rudolf N. Wallace, Glastonbury, Conn., assignor to United Aircraft Corporation, East Hartford, Conn., a corporation of Delaware
Filed Oct. 28, 1960, Ser. No. 65,774
1 Claim. (Cl. 285—368)

This invention relates to fluid-tight connections for axially aligned tubular members, such as pipe sections, and particularly to sealed joints for liquid-metal-conducting pipes which must be absolutely fluid-tight and which are subjected to temperature variations over a range of 2000° F. or more. A joint of this type should also be able to maintain a fluid-tight seal during slight deformations or deflections of the joint.

It is a primary object of this invention to provide such a fluid-tight connection for tubular members in which the sealing and the mechanical joining features of the joint are independent of each other.

Another object of the invention is to provide a bellows-sealed pipe connection in which the ends of the bellows are sealed to the connected pipe sections by swedging rings.

A still further object of the invention is to provide a sealed joint between pipe sections in which the seal is independent of the mechanical connection between the sections and is also independent of differences of thermal expansion of the joint parts.

A yet further object of the invention is generally to improve the construction and performance of mechanically connected sealed pipe joints.

These and other advantages of the invention will be apparent or will be pointed out in connection with the following detailed description of a preferred embodiment of the invention shown in the accompanying drawing.

In this drawing:

FIG. 1 shows a longitudinal sectional view through a pipe joint embodying this invention with the parts disassembled; and FIG. 2 shows the joint after it has been made up.

In the drawing, the two tubular members which are to be connected are indicated at 10 and 12. Each tubular member or pipe, as herein shown, has an end section 14 and 16 welded thereto at 18 and 20, respectively. The end sections are provided with thickened terminal portions 22 and 24 which are externally threaded at 26 and 28. Each end section is further provided with an integral terminal flange 30 and 32 which have cylindrical peripheral surfaces 34 and 36. One end section, here the section 14, is provided with a recess 38 in which the end portion 40 of section 16 is piloted. It will be noted that when the end sections 14 and 16 are assembled in abutting relation, as shown in FIGS. 1 and 2, the external cylindrical surfaces 34 and 36 lie adjacent each other.

The seal between the end sections 14 and 16 is provided by a bellows having cylindrical end portions 42 and 44 which overlie the cylindrical surfaces 34 and 36 of the terminal flanges 30 and 32. The bellows also includes an intermediate flexible portion 46 which connects the end portions 42 and 44. Swedging rings 48 and 50 are provided, which when forced over the terminal flanges with the bellows in position thereon, clamp the end portions 42 and 44 thereof in a fluid-tight manner against surfaces 34 and 36. Although the surfaces 34 and 36 have been shown herein as smooth cylindrical surfaces, they may be, if desired, grooved or serrated to bite into the end portions 42 and 44; or alternatively, the end portions themselves may be roughened or grooved. If necessary, a split ring 51 can be provided which can be collapsed and inserted between the faces of the flexible section 46 of the bellows. This ring prevents these faces from being forced together when the swedging rings are driven on.

The swedging rings 48 and 50, which are identical in construction, are formed with a tapered or, herein, curved advancing surface 52, which facilitates movement of the ring over the end portion of the bellows. Also, the internal surface 54 of the swedging ring may be, and preferably is, slightly tapered to enhance the swedging action of the ring.

The swedging rings 48 and 50 are moved forcibly onto the end portions 34 and 36 of the bellows by means of internally threaded clamping rings 56 and 58, which are turned onto the threaded portions 26 and 28. To facilitate this turning movement of rings 56 and 58, the latter are provided with spanner wrench holes 59.

In addition to the sealing connection above-described, independent means is provided for mechanically connecting the pipes. This mechanical connection includes a pair of annular clamping members 60 and 62 having inwardly directed flange 64 and 66 which engage the rings 56 and 58 as abutments. A series of peripheral-clamping bolts 68 extend through apertures 70 in these clamping members to mechanically draw the pipes together in a more or less usual manner. Gland nuts, V-clamps, or other means of mechanical connection, could alternatively be used to draw the pipes together.

The method of use of the joint will be clear from the above description. It will be evident that the fluid-sealing joint between the tubular members is entirely separate from the mechanical connection afforded by the bolted flanged members 60 and 62. It will also be noted that the sealing joint is not affected by expansion and contraction of the members or by the clamping action of the bolted connection.

As a result of this invention, a very simple and very effective fluid-sealed joint has been provided for liquid-metal-conducting pipes which is easy to assemble and is free from many of the usual difficulties encountered in use.

While only one embodiment of the invention has been shown herein for purposes of illustration, it will be understood that various changes in the construction and arrangement of the parts may be resorted to without departing from the scope of the appended claim.

I claim:

In combination with tubular members to be connected together in end-to-end relation and subject to expansion and contraction over a wide-temperature range, a sealing sleeve comprising cylindrical end portions and a flexible portion connecting said end portions, said end portions closely overlying cylindrical enlarged flange portions on said tubular members and said flexible portion comprising a single annular loop, a swedging ring having a forced fit over each end portion, a ring threaded onto each tubular member adjacent each flange portion for forcing its swedging ring onto its flange portion with said end portion clamped tightly thereagainst to form a fluid-tight annular seal, a bolted flange connection between said tubular members, and a split ring surrounding said tubular members and projecting into said loop of said sealing sleeve for maintaining said end portions against axial displacement as said swedging rings are forced onto said flange portions.

References Cited in the file of this patent

UNITED STATES PATENTS

| | | |
|---|---|---|
| 582,575 | Bayles | May 11, 1897 |
| 787,791 | Reynolds | Apr. 18, 1905 |
| 1,926,107 | Morehead | Sept. 12, 1933 |
| 2,234,785 | Tolman | Mar. 11, 1941 |
| 2,568,301 | Pottberg | Sept. 18, 1951 |

FOREIGN PATENTS

| | | |
|---|---|---|
| 12,838 | Austria | Aug. 10, 1903 |
| 756,108 | Great Britain | Aug. 29, 1956 |
| 792,476 | Great Britain | Mar. 26, 1958 |